US011462759B2

(12) United States Patent
Nishiwaki et al.

(10) Patent No.: US 11,462,759 B2
(45) Date of Patent: Oct. 4, 2022

(54) COMPOSITE, AND ELECTROCHEMICAL REACTION CELL STACK

(71) Applicant: MORIMURA SOFC TECHNOLOGY CO., LTD., Komaki (JP)

(72) Inventors: Hideki Nishiwaki, Nagoya (JP); Nobuyuki Hotta, Nagoya (JP); Tetsuo Suehiro, Nagoya (JP); Hiroshi Sumi, Nagoya (JP)

(73) Assignee: MORIMURA SOFC TECHNOLOGY CO., LTD., Komaki (JP)

( * ) Notice: Subject to any disclaimer, the term of this patent is extended or adjusted under 35 U.S.C. 154(b) by 63 days.

(21) Appl. No.: 16/966,781

(22) PCT Filed: Jan. 18, 2019

(86) PCT No.: PCT/JP2019/001449
§ 371 (c)(1),
(2) Date: Jul. 31, 2020

(87) PCT Pub. No.: WO2019/207856
PCT Pub. Date: Oct. 31, 2019

(65) Prior Publication Data
US 2020/0358121 A1    Nov. 12, 2020

(30) Foreign Application Priority Data

Apr. 23, 2018  (JP) .............................. JP2018-081976

(51) Int. Cl.
*H01M 8/1213*    (2016.01)
*H01M 4/90*    (2006.01)
(Continued)

(52) U.S. Cl.
CPC ............. *H01M 8/1213* (2013.01); *C25B 9/23* (2021.01); *H01M 4/8882* (2013.01);
(Continued)

(58) Field of Classification Search
None
See application file for complete search history.

(56) References Cited

U.S. PATENT DOCUMENTS

| 5,733,499 A * | 3/1998 | Takeuchi .............. C04B 35/111 |
| | | 257/E23.009 |
| 2012/0129068 A1 | 5/2012 | Narendar et al. |
| 2014/0017579 A1* | 1/2014 | Hata ................... C04B 35/6261 |
| | | 429/408 |

FOREIGN PATENT DOCUMENTS

| EP | 0 704 413 B1 | 3/2000 |
| JP | 8-64216 A | 3/1996 |

(Continued)

OTHER PUBLICATIONS

International Search Report (PCT/ISA/210), issued by International Searching Authority in corresponding International Application No. PCT/JP2019/001449, dated Apr. 9, 2019.
(Continued)

*Primary Examiner* — Jonathan Crepeau
(74) *Attorney, Agent, or Firm* — Sughrue Mion, PLLC

(57) ABSTRACT

A composite including an electrolyte layer containing solid oxide, and at least one electrode selected from a cathode disposed on one side of the electrolyte layer in a first direction and an anode disposed on the other side of the electrolyte layer in the first direction. Either one of two surfaces of the composite located on opposite sides in the first direction satisfies a first requirement that, as viewed in the first direction, a curvature determined on the basis of any three points juxtaposed at intervals of 5 mm is less than 0.0013 (1/mm) and that, as viewed in a second direction perpendicular to the first direction, the curvature is the reciprocal of the radius of an imaginary circle passing through the any three points.

5 Claims, 8 Drawing Sheets

(51) Int. Cl.
*H01M 4/88* (2006.01)
*H01M 8/1226* (2016.01)
*C25B 9/23* (2021.01)
*H01M 8/124* (2016.01)
*H01M 8/12* (2016.01)

(52) U.S. Cl.
CPC ....... *H01M 4/9025* (2013.01); *H01M 8/1226* (2013.01); *H01M 2008/1293* (2013.01)

(56) References Cited

FOREIGN PATENT DOCUMENTS

| | | | |
|---|---|---|---|
| JP | 2001-247373 | A | 9/2001 |
| JP | 2005-158613 | * | 6/2005 |
| JP | 2006-104058 | A | 4/2006 |
| JP | 2010-182665 | * | 8/2010 |
| JP | 2012-227069 | * | 11/2012 |
| JP | 2013-089496 | A | 5/2013 |
| JP | 2015-118925 | A | 6/2015 |
| KR | 10-2015-0052662 | A | 5/2015 |

OTHER PUBLICATIONS

Communication dated Dec. 2, 2021 issued by the European Patent Office in corresponding application No. 19793613.1.

* cited by examiner

FIG. 8

| | PERCENTAGE OF CURVATURE C (1/mm) (%) | | | | WARP RATE (%) | PRESENCE/ ABSENCE OF CELL CRACKING |
|---|---|---|---|---|---|---|
| | C<0.0010 | 0.0010≦C <0.0013 | 0.0013≦C <0.0016 | 0.0016≦C | | |
| COMPARATIVE EXAMPLE | 93.6 | 2.7 | 1.8 | 2.0 | 0.20 | PRESENT |
| EXAMPLE 1 | 98.9 | 1.1 | 0.0 | 0.0 | 0.18 | ABSENT |
| EXAMPLE 2 | 99.4 | 0.6 | 0.0 | 0.0 | 0.11 | ABSENT |
| EXAMPLE 3 | 99.4 | 0.6 | 0.0 | 0.0 | 0.18 | ABSENT |
| EXAMPLE 4 | 100.0 | 0.0 | 0.0 | 0.0 | 0.09 | ABSENT |
| EXAMPLE 5 | 99.5 | 0.5 | 0.0 | 0.0 | 0.10 | ABSENT |
| EXAMPLE 6 | 99.4 | 0.6 | 0.0 | 0.0 | 0.11 | ABSENT |

COMPOSITE, AND ELECTROCHEMICAL REACTION CELL STACK

This application is a National Stage of International Application No. PCT/JP2019/001449 filed Jan. 18, 2019 claiming priority from Japanese Patent Application No. 2018-081976 filed on Apr. 13, 2018.

TECHNICAL FIELD

The technique disclosed in the present specification relates to a composite.

BACKGROUND ART

A known type of a fuel cell for generating electricity by utilizing electrochemical reaction between hydrogen and oxygen is a solid oxide fuel cell (hereinafter, also called "SOFC") having an electrolyte layer that contains solid oxide. Generally, the SOFC is utilized in the form of a fuel cell stack in which a plurality of single fuel cells (hereinafter, called merely "single cells") are arranged in a predetermined direction (hereinafter, called a "first direction"). The single cell includes an electrolyte layer, and a cathode and an anode that face each other in the first direction with the electrolyte layer intervening therebetween.

Meanwhile, warpage in the first direction may be present in a single cell due to, for example, shrinkage of the single cell in the course of firing. If warpage is present in a single cell, for example, when a plurality of single cells are stacked for manufacture of a fuel cell stack, a stacking load concentrates on a particular position of the warped single cell; as a result, a fissure or crack (hereinafter, called "a crack or the like") is highly likely to develop in the single cell. Also, as a result of repeated start and stop of electricity generation of the fuel cell stack, thermal stress concentrates on a particular position of the warped single cell, whereby the possibility of development of a crack or the like in the single cell increases.

Thus, conventionally, various techniques have been proposed for bringing the amount of overall warpage (amount of overall flexure) of a single cell within a predetermined numerical range (Patent Documents 1 to 4).

PRIOR ART DOCUMENTS

Patent Documents

Patent Document 1: Japanese Patent Application Laid-Open (kokai) No. 2013-89496
Patent Document 2: Japanese Patent Application Laid-Open (kokai) No. 2015-118925
Patent Document 3: Japanese Patent Application Laid-Open (kokai) No. 2001-247373
Patent Document 4: Japanese Patent Application Laid-Open (kokai) No. 2006-104058

SUMMARY OF THE INVENTION

Problem to be Solved by the Invention

Other than the above-mentioned overall warpage of a single cell, a local surface undulation may be present on the surface of the single cell due to, for example, variations in thickness, component density, or the like of a cell precursor from which the single cell is produced through firing. The possibility of development of a crack or the like also increases in the case where a local surface undulation is present on the surface of the single cell, because stacking load and/or thermal stress concentrates on an undulating portion. The above-mentioned conventional techniques can prevent development of a crack or the like caused by overall warpage of the single cell, but fail to prevent development of a crack or the like caused by presence of a local surface undulation. Particularly, the greater the increase in area and the reduction in thickness of the single cell, the more marked the occurrence of such a problem.

Such a problem is common with a so-called half cell having an electrolyte layer and one of a cathode and an anode. Also, such a problem is common with a solid oxide electrolysis cell (hereinafter, may be called "SOEC") that generates hydrogen by utilizing electrolysis of water. Notably, in the present specification, a single fuel cell and a single electrolysis cell are collectively called a single electrochemical reaction cell.

The present specification discloses a technique for solving the above-mentioned problem at least partially.

Means for Solving the Problem

A technique disclosed in the present specification can be implemented in the following modes.

(1) A composite disclosed in the present specification comprises an electrolyte layer containing solid oxide, and at least one electrode selected from a cathode disposed on one side of the electrolyte layer in a first direction and an anode disposed on the other side of the electrolyte layer in the first direction. The composite is characterized in that one surface of two surfaces of the composite located on opposite sides in the first direction satisfies a first requirement that, as viewed in the first direction, a curvature determined on the basis of any three points juxtaposed at intervals of 5 mm is less than 0.0013 (1/mm) and that, as viewed in a second direction perpendicular to the first direction, the curvature is the reciprocal of the radius of an imaginary circle passing through the any three points. According to the present composite, at least either one of two surfaces of the composite satisfies the first requirement that the curvature determined on the basis of any three points juxtaposed at intervals of 5 mm on the surface is less than 0.0013 (1/mm). By virtue of this, a reduction in strength due to local warpage of the surface of the composite can be prevented, in contrast to a structure in which a region having a curvature of 0.0013 (1/mm) or more is present on the surface.

(2) The above composite may be configured such that the surface of the composite satisfying the first requirement further satisfies a second requirement that the surface has a warp rate of 0.18% or less. According to the present composite, at least either one of two surfaces of the composite further satisfies the second requirement that the entire surface has a warp rate of 0.18% or less. By virtue of this, the strength of the composite can be enhanced, as compared with a structure in which a warp rate of the entire surface is higher than 0.18%.

(3) The above composite may be configured such that the composite includes the cathode and the anode, the cathode is disposed on one side of the composite in the first direction, the anode is disposed on the other side of the composite in the first direction, and the surface of the composite on the one side in the first direction satisfies the first requirement. The present composite can be prevent a reduction in strength, which would otherwise result from local warpage of the surface of the cathode. Also, the composite can prevent a reduction in electrical conductivity between the cathode and a cathode-side current collector, which would otherwise result from poor contact between the cathode and the cathode-side current collector joined to the cathode.

(4) The above composite may be configured such that the composite includes only the electrolyte layer and the anode selected from the electrolyte layer, the cathode, and the anode and such that the surface of the composite on the one side in the first direction satisfies the first requirement. The present composite can prevent a reduction in strength, which would otherwise result from local warpage of the surface of the electrolyte layer.

The technique disclosed in the present specification can be implemented in various modes; for example, a half cell having an electrolyte layer and an anode, a single fuel cell, a fuel cell electricity generation unit, a fuel cell stack having a plurality of fuel cell electricity generation units, an electricity generation module having a fuel cell stack, a fuel cell system having an electricity generation module, an electrolysis cell unit, an electrolysis cell stack having a plurality of electrolysis cell units, a hydrogen generation module having an electrolysis cell stack, and a hydrogen generation system having a hydrogen generation module.

BRIEF DESCRIPTION OF THE DRAWINGS

FIG. 8 Explanatory table showing the results of performance evaluation.

MODES FOR CARRYING OUT THE INVENTION

A. Embodiment

A-1. Structure (Structure of Fuel Cell Stack 100)

Figure 1:
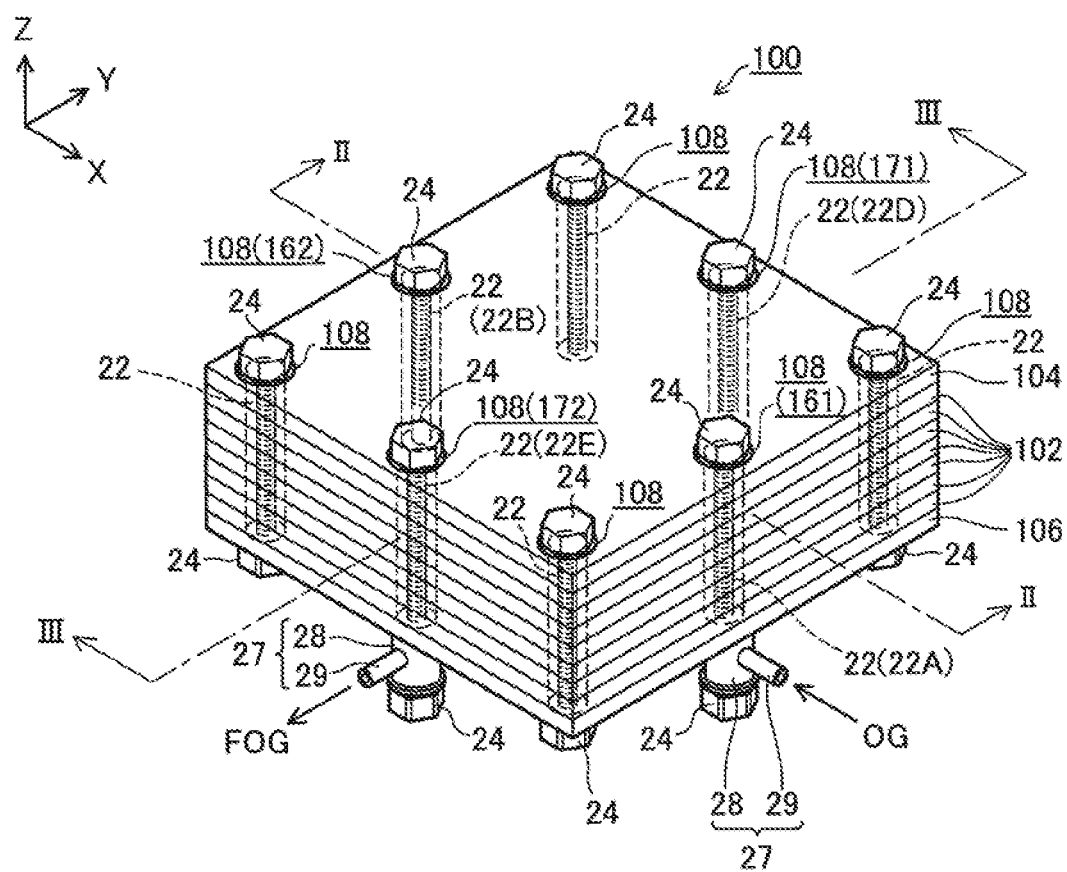
FIG. 1 Perspective view showing the external structure of a fuel cell stack 100 according to the present embodiment.
Figure 2:
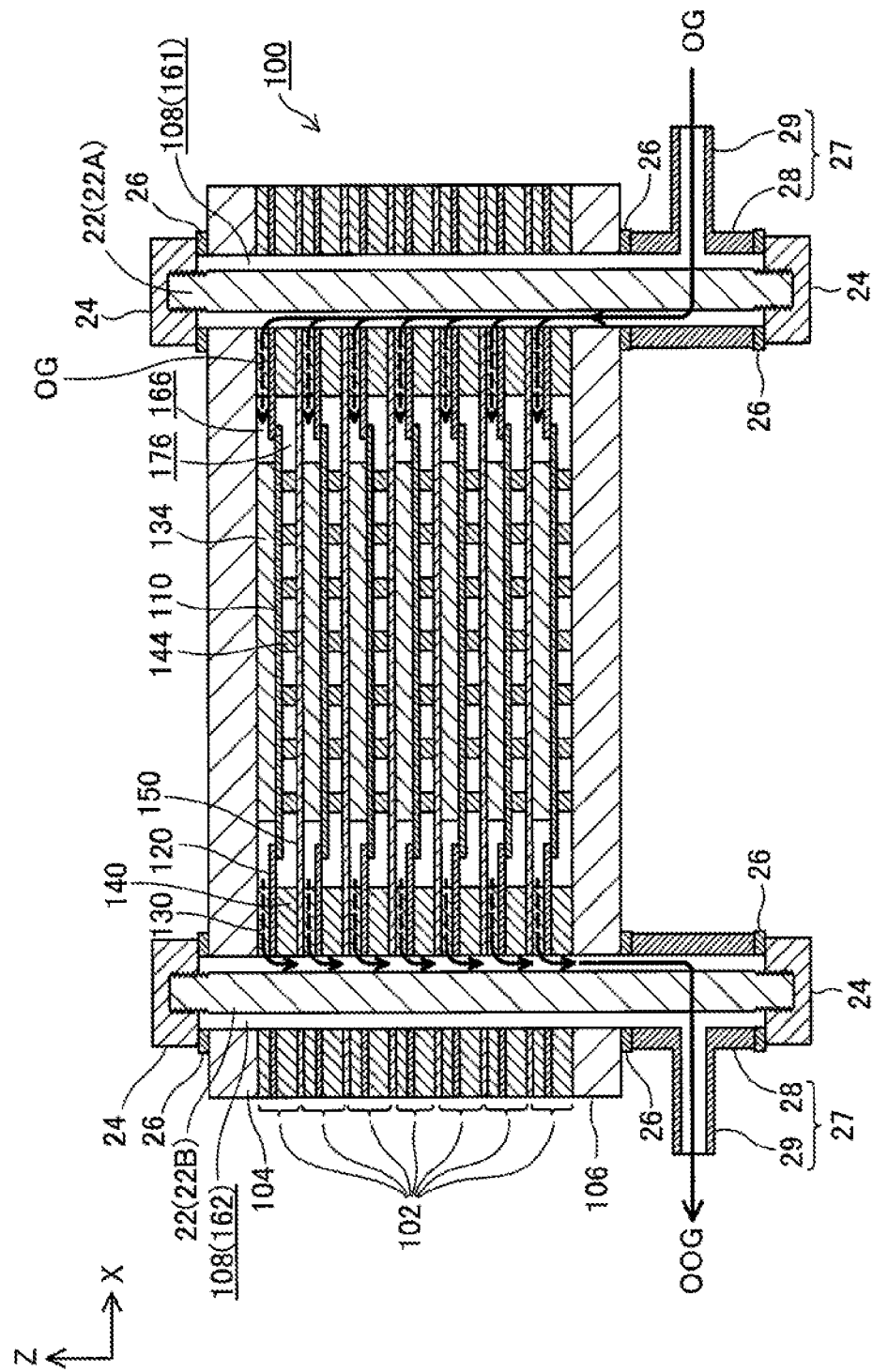
FIG. 2 Explanatory view showing the structure of the fuel cell stack 100 in an XZ cross section taken along line II-II of FIG. 1.
Figure 3:
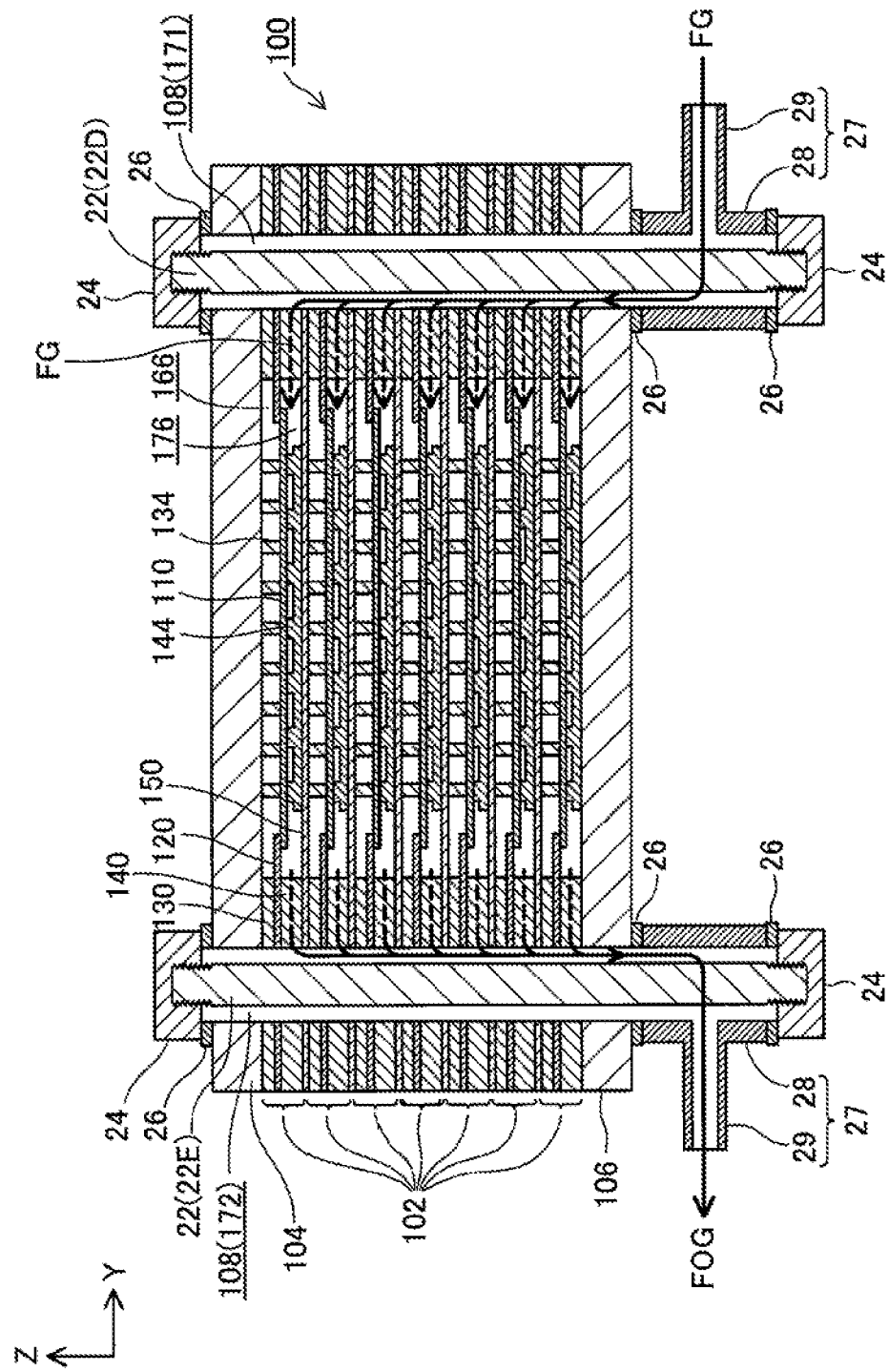
FIG. 3 Explanatory view showing the structure of the fuel cell stack 100 in a YZ cross section taken along line III-III of FIG. 1.

FIG. 1 is a perspective view showing the external structure of a fuel cell stack 100 according to the present embodiment; FIG. 2 is an explanatory view showing the structure of the fuel cell stack 100 in an XZ cross section taken along line II-II of FIG. 1; and FIG. 3 is an explanatory view showing the structure of the fuel cell stack 100 in a YZ cross section taken along line III-III of FIG. 1. FIGS. 1 to 3 show mutually orthogonal X-axis, Y-axis, and Z-axis for specifying directions. In the present specification, for the sake of convenience, the positive Z axis direction is called the upward direction and the negative Z-axis direction is called the downward direction; however, in actuality, the fuel cell stack 100 may be disposed in a different orientation. The same also applies to FIG. 4 and subsequent drawings.

The fuel cell stack 100 includes a plurality of (seven in the present embodiment) electricity generation units 102 and a pair of end plates 104 and 106. The seven electricity generation units 102 are arranged in a predetermined direction of arrangement (in the vertical direction in the present embodiment). The paired end plates 104 and 106 are disposed in such a manner as to vertically sandwich an assembly of the seven electricity generation units 102. Notably, the direction of arrangement (vertical direction) corresponds to the first direction appearing in CLAIMS.

Each of component layers (the electricity generation units 102 and the end plates 104 and 106) of the fuel cell stack 100 has a plurality (eight in the present embodiment) of holes formed in a peripheral portion thereof extending about the Z-axis direction such that the holes extend through the peripheral portion in the vertical direction. The corresponding holes formed in the layers communicate with one another in the vertical direction, thereby forming through holes 108 extending in the vertical direction from one end plate 104 to the other end plate 106. In the following description, individual holes which constitute each through hole 108 and are formed in the individual layers of the fuel cell stack 100 may also be called the through holes 108.

Bolts 22 extending in the vertical direction are inserted into the corresponding through holes 108, and the fuel cell stack 100 is clamped by means of the bolts 22 and nuts 24 engaged with opposite ends of the bolts 22. Notably, as shown in FIGS. 2 and 3, an insulation sheet 26 is disposed between the nuts 24 engaged with one ends (upper ends) of the bolts 22 and the upper surface of the end plate 104 serving as the upper end of the fuel cell stack 100, and another insulation sheet 26 is disposed between the nuts 24 engaged with the other ends (lower ends) of the bolts 22 and the lower surface of the end plate 106 serving as the lower end of the fuel cell stack 100. However, in each region where a gas passage member 27, which will be described later, is provided, the gas passage member 27 and the insulation sheets 26 disposed on the upper side and on the lower side, respectively, of the gas passage member 27 intervene between the nut 24 and the surface of the end plate 106. The insulation sheet 26 is formed of, for example, a mica sheet, a ceramic fiber sheet, a ceramic compact sheet, a glass sheet, or a glass ceramic composite material.

The outside diameter of a shaft portion of each bolt 22 is smaller than the inside diameter of each communication hole 108. Accordingly, a space exists between the outer circumferential surface of the shaft portion of each bolt 22 and the inner circumferential surface of each communication hole 108. As shown in FIGS. 1 and 2, a space defined by the bolt 22 (bolt 22A) located at around the midpoint of one side of the perimeter (extending about the Z-axis direction) of the fuel cell stack 100 (the one side is one of the two sides in parallel with the Y-axis and is located on the positive side in the X-axis direction) and the communication hole 108 into which the bolt 22A is inserted functions as an oxidizer gas introduction manifold 161 into which oxidizer gas OG is introduced from outside the fuel cell stack 100 and which serves as a gas flow channel for supplying the oxidizer gas OG to the electricity generation units 102. A space defined by the bolt 22 (bolt 22B) located at around the midpoint of the other side opposite the above side (the other side is the other of the two sides in parallel with the Y-axis and is located on the negative side in the X-axis direction) and the communication hole 108 into which the bolt 22B is inserted functions as an oxidizer gas discharge manifold 162 from which oxidizer offgas OOG discharged from air chambers 166 of the electricity generation units 102 is discharged to the outside of the fuel cell stack 100. In the present embodiment, for example, air is used as the oxidizer gas OG.

As shown in FIGS. 1 and 3, a space defined by the bolt 22 (bolt 22D) located at around the midpoint of one side of the perimeter (extending about the Z-axis direction) of the fuel cell stack 100 (the one side is one of the two sides in parallel with the X-axis and is located on the positive side in the Y-axis direction) and the communication hole 108 into which the bolt 22D is inserted functions as an fuel gas introduction manifold 171 into which fuel gas FG is introduced from outside the fuel cell stack 100 and which supplies the fuel gas FG to the electricity generation units 102. A space defined by the bolt 22 (bolt 22E) located at around the midpoint of the other side opposite the above side (the other side is the other of the two sides in parallel with the X-axis and is located on the negative side in the Y-axis direction) and the communication hole 108 into which the bolt 22E is inserted functions as a fuel gas discharge manifold 172 from which fuel offgas FOG discharged from fuel chambers 176 of the electricity generation units 102 is discharged to the outside of the fuel cell stack 100. In the present embodiment, for example, hydrogen-rich gas reformed from city gas is used as the fuel gas FG.

The fuel cell stack 100 has four gas passage members 27. Each gas passage member 27 has a tubular body portion 28 and a tubular branch portion 29 branching from the side surface of the body portion 28. The hole of the branch portion 29 communicates with the hole of the body portion 28. A gas pipe (not shown) is connected to the branch portion 29 of each gas passage member 27. As shown in FIG. 2, the hole of the body portion 28 of the gas passage member 27 disposed at the position of the bolt 22A which defines the oxidizer gas introduction manifold 161 communicates with the oxidizer gas introduction manifold 161, whereas the hole of the body portion 28 of the gas passage member 27 disposed at the position of the bolt 22B which defines the oxidizer gas discharge manifold 162 communicates with the oxidizer gas discharge manifold 162. Also, as shown in FIG. 3, the hole of the body portion 28 of the gas passage member 27 disposed at the position of the bolt 22D which defines the fuel gas introduction manifold 171 communicates with the fuel gas introduction manifold 171, whereas the hole of the body portion 28 of the gas passage member 27 disposed at the position of the bolt 22E which defines the fuel gas discharge manifold 172 communicates with the fuel gas discharge manifold 172.

(Structure of End Plates 104 and 106)

The paired end plates 104 and 106 are electrically conductive members each having an approximately square flat-plate shape and are formed of, for example, stainless steel. One end plate 104 is disposed on the upper side of the uppermost electricity generation unit 102, and the other end plate 106 is disposed on the lower side of the lowermost electricity generation unit 102. A plurality of the electricity generation units 102 are held under pressure between the two end plates 104 and 106. The upper end plate 104 functions as a positive output terminal of the fuel cell stack 100, and the lower end plate 106 functions as a negative output terminal of the fuel cell stack 100.

(Structure of Electricity Generation Unit 102)

Figure 4:
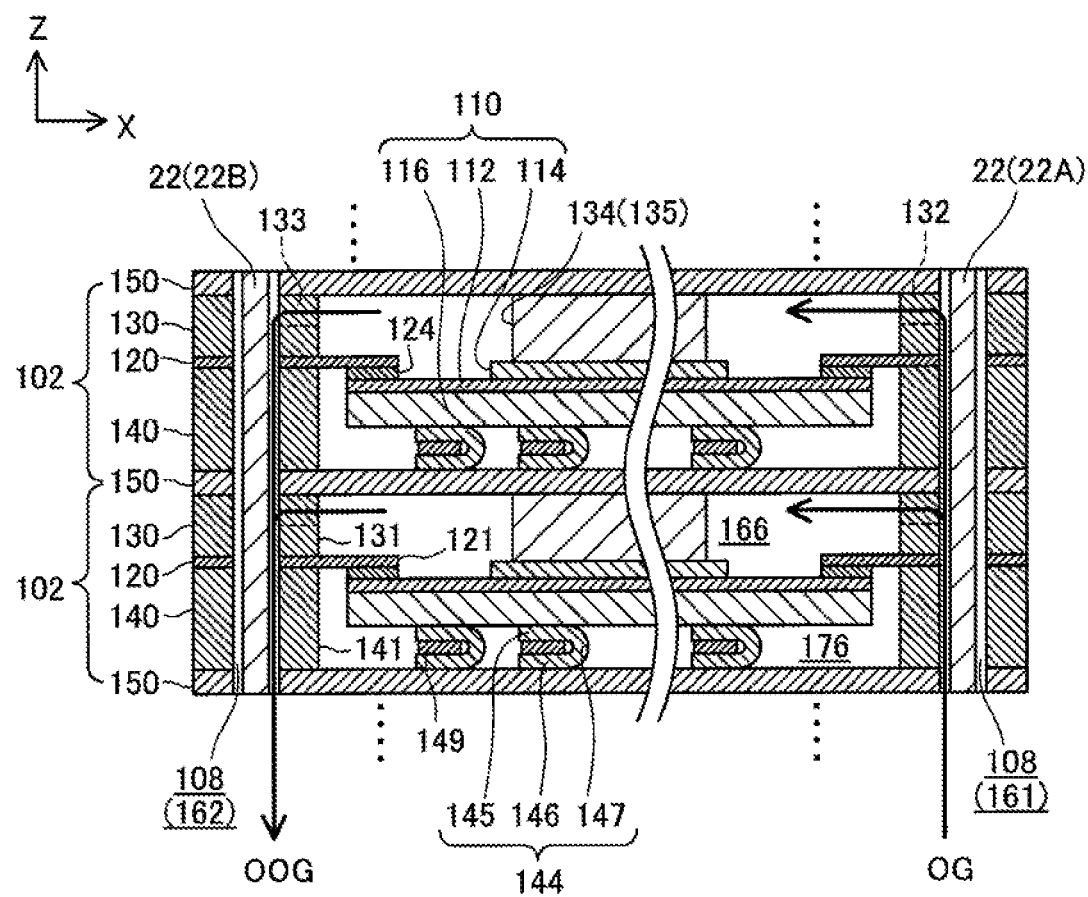
FIG. 4 Explanatory view of the same XZ cross section as that of FIG. 2, showing two adjacent electricity generation units 102.
Figure 5:
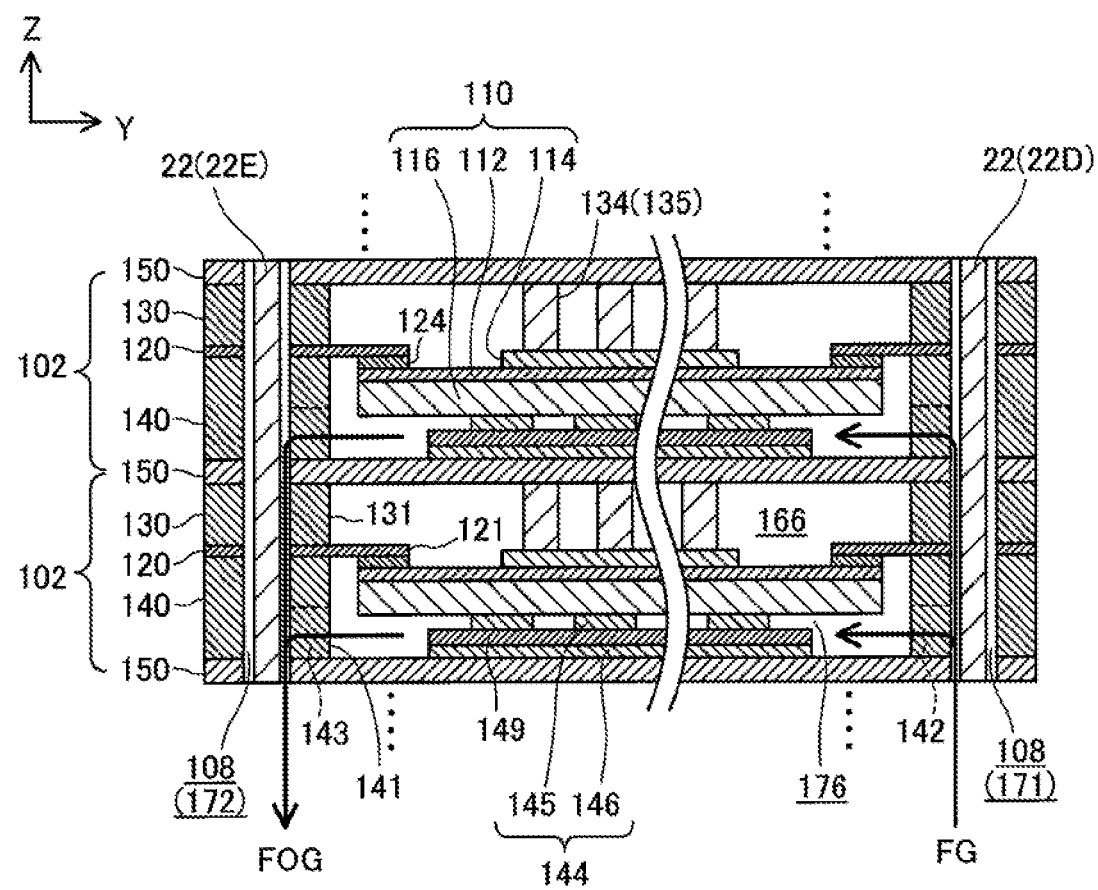
FIG. 5 Explanatory view of the same YZ cross section as that of FIG. 3, showing two adjacent electricity generation units 102.

FIG. 4 is an explanatory view of the same XZ cross section as that of FIG. 2, showing two adjacent electricity generation units 102, and FIG. 5 is an explanatory view of the same YZ cross section as that of FIG. 3, showing two adjacent electricity generation units 102.

As shown in FIGS. 4 and 5, the electricity generation unit 102 serving as the smallest unit of electricity generation includes a single cell 110, a separator 120, a cathode-side frame 130, a cathode-side current collector 134, an anode-side frame 140, an anode-side current collector 144, and a pair of interconnectors 150 serving as the uppermost layer and the lowermost layer of the electricity generation unit 102. Holes corresponding to the communication holes 108 into which the above-described blots 22 are inserted are formed in peripheral portions (extending about the Z-axis direction) of the separator 120, the cathode-side frame 130, the anode-side frame 140, and the interconnectors 150.

The interconnector 150 is an electrically conductive member having an approximately square flat-plate shape and is formed of, for example, ferritic stainless steel. The interconnector 150 secures electrical conductivity between the electricity generation units 102 and prevents mixing of reaction gases between the electricity generation units 102. In the present embodiment, two electricity generation units 102 disposed adjacent to each other share one interconnector 150. That is, the upper interconnector 150 of a certain electricity generation unit 102 serves as a lower interconnector 150 of another electricity generation unit 102 adjacently located on the upper side of the certain electricity generation unit 102. Also, since the fuel cell stack 100 has the two end plates 104 and 106, the uppermost electricity generation unit 102 of the fuel cell stack 100 does not have the upper interconnector 150, and the lowermost electricity generation unit 102 does not have the lower interconnector 150 (see FIGS. 2 and 3).

The single cell 110 includes an electrolyte layer 112, and an air electrode (cathode) 114 and a fuel electrode (anode) 116 which face each other in the vertical direction (the direction of arrangement of the electricity generation units 102) with the electrolyte layer 112 intervening therebetween. The single cell 110 of the present embodiment is an anode-support-type single cell in which the anode 116 supports the electrolyte layer 112 and the cathode 114.

The electrolyte layer 112 is a member having an approximately square flat plate shape and contains at least Zr; for example, is formed of a solid oxide such as YSZ (yttria-stabilized zirconia), ScSZ (scandia-stabilized zirconia), or CaSZ (calcia-stabilized zirconia). The cathode 114 is a member having an approximately square flat-plate shape and is formed of, for example, a perovskite-type oxide (e.g., LSCF (lanthanum strontium cobalt ferrite), LSM (lanthanum strontium manganese oxide), or LNF (lanthanum nickel ferrite)). The anode 116 is a member having an approximately square flat-plate shape and is formed of, for example, Ni (nickel), a cermet of Ni and ceramic particles, or an Ni-based alloy. Thus, the single cell 110 (electricity generation unit 102) of the present embodiment is a solid oxide fuel cell (SOFC) which uses a solid oxide as an electrolyte.

The separator 120 is a frame member which has an approximately square hole 121 formed in a central region thereof and extending therethrough in the vertical direction, and is formed of, for example, a metal. A portion of the separator 120 around the hole 121 faces a peripheral portion of the surface of the electrolyte layer 112 on the cathode 114 side. The separator 120 is bonded to the electrolyte layer 112 (single cell 110) by means of a bonding portion 124 formed of a brazing material and disposed between the facing portion and the electrolyte layer 112. The separator 120 separates the air chamber 166 which faces the cathode 114, and the fuel chamber 176 which faces the anode 116, from each other, thereby preventing gas leakage from one electrode side to the other electrode side through a peripheral portion of the single cell 110. Notably, the single cell 110 to which the separator 120 is bonded is also called a separator-attached single cell.

The cathode-side frame 130 is a frame member which has an approximately square hole 131 formed in a central region thereof and extending therethrough in the vertical direction, and is formed of, for example, an insulator such as mica. The hole 131 of the cathode-side frame 130 constitutes the air chamber 166 which faces the cathode 114. The cathode-side frame 130 is in contact with a peripheral portion of the surface of the separator 120 on a side opposite the electrolyte layer 112 and with a peripheral portion of the surface of the interconnector 150 on a side toward the cathode 114. The cathode-side frame 130 electrically insulates the paired interconnectors 150 contained in the electricity generation unit 102 from each other. Also, the cathode-side frame 130 has an oxidizer gas supply communication hole 132 formed therein and adapted to establish communication between the oxidizer gas introduction manifold 161 and the air chamber 166, and an oxidizer gas discharge communication hole 133 formed therein and adapted to establish communication between the air chamber 166 and the oxidizer gas discharge manifold 162.

The anode-side frame 140 is a frame member which has an approximately square hole 141 formed in a central region thereof and extending therethrough in the vertical direction, and is formed of, for example, a metal. The hole 141 of the anode-side frame 140 constitutes the fuel chamber 176 which faces the anode 116. The anode-side frame 140 is in contact with a peripheral portion of the surface of the separator 120 on a side toward the electrolyte layer 112 and with a peripheral portion of the surface of the interconnector 150 on a side toward the anode 116. Also, the anode-side frame 140 has a fuel gas supply communication hole 142 formed therein and adapted to establish communication between the fuel gas introduction manifold 171 and the fuel chamber 176, and a fuel gas discharge communication hole 143 formed therein and adapted to establish communication between the fuel chamber 176 and the fuel gas discharge manifold 172.

The anode-side current collector 144 is disposed within the fuel chamber 176. The anode-side current collector 144 includes an interconnector facing portion 146, electrode facing portions 145, and connection portions 147 which connect the electrode facing portions 145 to the interconnector facing portion 146, and is formed of, for example, nickel, a nickel alloy, or stainless steel. The electrode facing portions 145 are in contact with the surface of the anode 116 on a side opposite the electrolyte layer 112, and the interconnector facing portion 146 is in contact with the surface of the interconnector 150 on a side toward the anode 116. However, as mentioned above, since the electricity generation unit 102 disposed at the lowermost position in the fuel cell stack 100 does not have the lower interconnector 150, the interconnector facing portion 146 in the lowermost electricity generation unit 102 is in contact with the lower end plate 106. Since the anode-side current collector 144 is thus configured, the anode-side current collector 144 electrically connects the anode 116 and the interconnector 150 (or the end plate 106) to each other. Notably, spacers 149 formed of, for example, mica are disposed between the electrode facing portions 145 and the interconnector facing portion 146. As a result, the anode-side current collector 144 follows the deformation of the electricity generation unit 102 stemming from a temperature cycle and a pressure variation of reaction gas, thereby maintaining good electrical connection between the anode 116 and the interconnector 150 (or the end plate 106) through the anode-side current collector 144.

The cathode-side current collector 134 is disposed within the air chamber 166. The cathode-side current collector 134 is composed of a plurality of current collector elements 135 each having an approximately rectangular columnar shape and is formed of, for example, ferritic stainless steel. The cathode-side current collector 134 is in contact with the surface of the cathode 114 on a side opposite the electrolyte layer 112 and with the surface of the interconnector 150 on a side toward the cathode 114. Specifically, the cathode-side current collector 134 is pressed against the cathode 114. However, as mentioned above, the electricity generation unit 102 disposed at the uppermost position in the fuel cell stack 100 does not have the upper interconnector 150. Therefore, the cathode-side current collector 134 in the uppermost electricity generation unit 102 is in contact with the upper end plate 104. Since the cathode-side current collector 134 is thus configured, the cathode-side current collector 134 electrically connects the cathode 114 and the interconnector 150 (or the end plate 104) to each other. Notably, the cathode-side current collector 134 and the interconnector 150 may be integrally formed as a unitary member. The cathode-side current collector 134 corresponds to the current collector appearing in CLAIMS.

A-2. Operation of Fuel Cell Stack 100

As shown in FIGS. 2 and 4, when the oxidizer gas OG is supplied through a gas pipe (not shown) connected to the branch portion 29 of the gas passage member 27 provided at the position of the oxidizer gas introduction manifold 161, the oxidizer gas OG is supplied to the oxidizer gas introduction manifold 161 through the holes of the branch portion 29 and the body portion 28 of the gas passage member 27 and is then supplied from the oxidizer gas introduction manifold 161 to the air chambers 166 through the oxidizer gas supply communication holes 132 of the electricity generation units 102. Also, as shown in FIGS. 3 and 5, when the fuel gas FG is supplied through a gas pipe (not shown) connected to the branch portion 29 of the gas passage member 27 provided at the position of the fuel gas introduction manifold 171, the fuel gas FG is supplied to the fuel gas introduction manifold 171 through the holes of the branch portion 29 and the body portion 28 of the gas passage member 27 and is then supplied from the fuel gas introduction manifold 171 to the fuel chambers 176 through the fuel gas supply communication holes 142 of the electricity generation units 102.

When the oxidizer gas OG is supplied to the air chamber 166 of each electricity generation unit 102, whereas the fuel gas FG is supplied to the fuel chamber 176 of each electricity generation unit 102, the single cell 110 generates electricity through the electrochemical reaction between the oxidizer gas OG and the fuel gas FG. The electricity generating reaction is an exothermic reaction. In each electricity generation unit 102, the cathode 114 of the single cell 110 is electrically connected to one interconnector 150 through the cathode-side current collector 134, whereas the anode 116 is electrically connected to the other interconnector 150 through the anode-side current collector 144. Also, a plurality of the electricity generation units 102 contained in the fuel cell stack 100 are connected electrically in series. Accordingly, electric energy generated in the electricity generation units 102 is output from the end plates 104 and 106 which function as output terminals of the fuel cell stack 100. Notably, in the SOFC, since electricity is generated at a relatively high temperature (e.g., 700° C. to 1,000° C.), the fuel cell stack 100 may be heated by a heater (not shown) from startup till the high temperature can be maintained by means of heat generated as a result of generation of electricity.

As shown in FIGS. 2 and 4, the oxidizer offgas OOG discharged from the air chambers 166 of the electricity generation units 102 is discharged to the oxidizer gas discharge manifold 162 through the oxidizer gas discharge communication holes 133, passes through the holes of the body portion 28 and the branch portion 29 of the gas passage member 27 provided at the position of the oxidizer gas discharge manifold 162, and is then discharged to the outside of the fuel cell stack 100 through a gas pipe (not shown) connected to the branch portion 29. Also, as shown in FIGS. 3 and 5, the fuel offgas FOG discharged from the fuel chambers 176 of the electricity generation units 102 is discharged to the fuel gas discharge manifold 172 through the fuel gas discharge communication holes 143, passes through the holes of the body portion 28 and the branch portion 29 of the gas passage member 27 provided at the position of the fuel gas discharge manifold 172, and is then discharged to the outside of the fuel cell stack 100 through a gas pipe (not shown) connected to the branch portion 29.

A-3. Requirements for Surface of Cathode 114 of Single Cell 110

Figure 6:
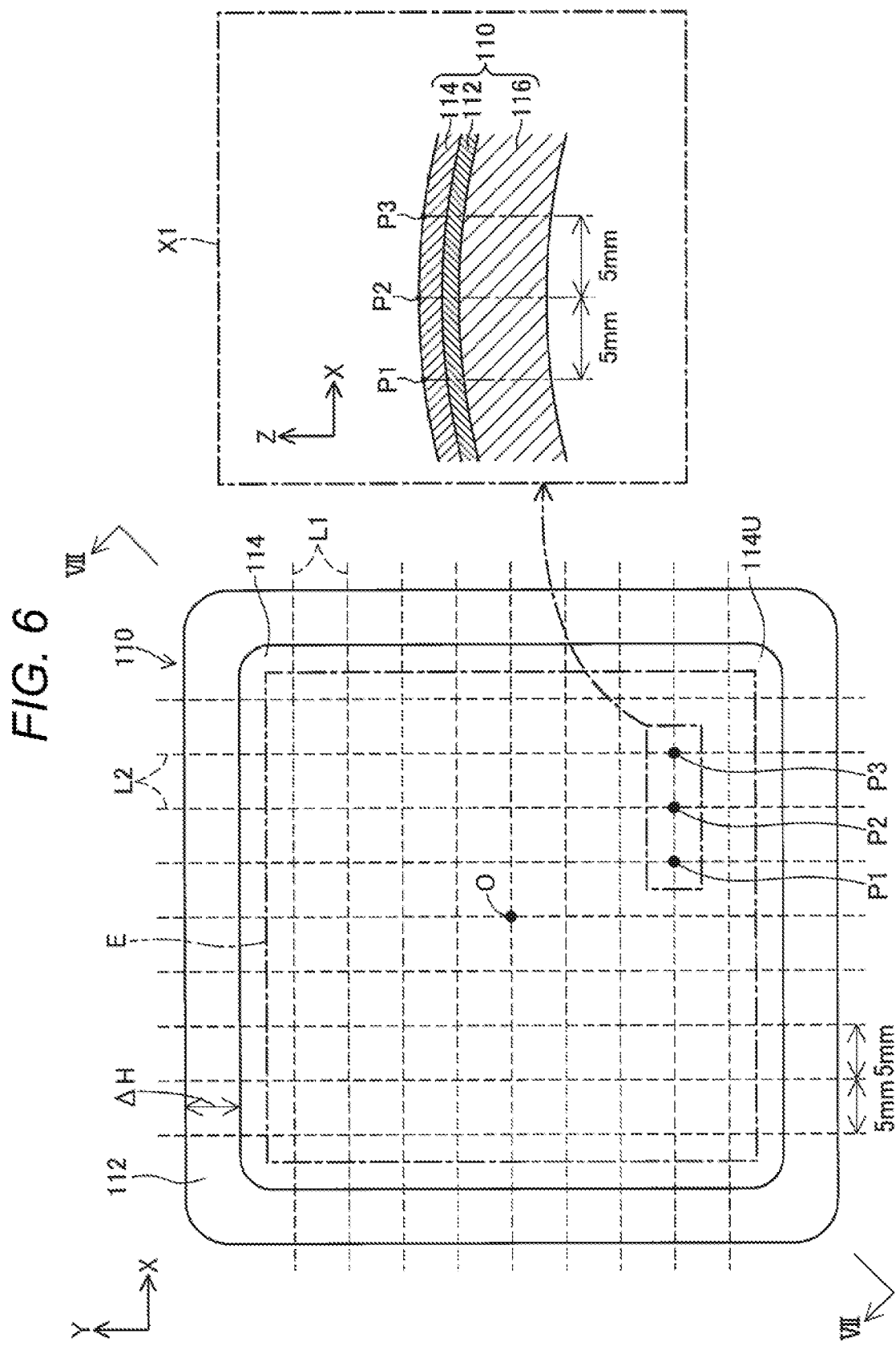
FIG. 6 Explanatory view schematically showing the structure of a single cell 110 in an XY plane (upper surface).
Figure 7:
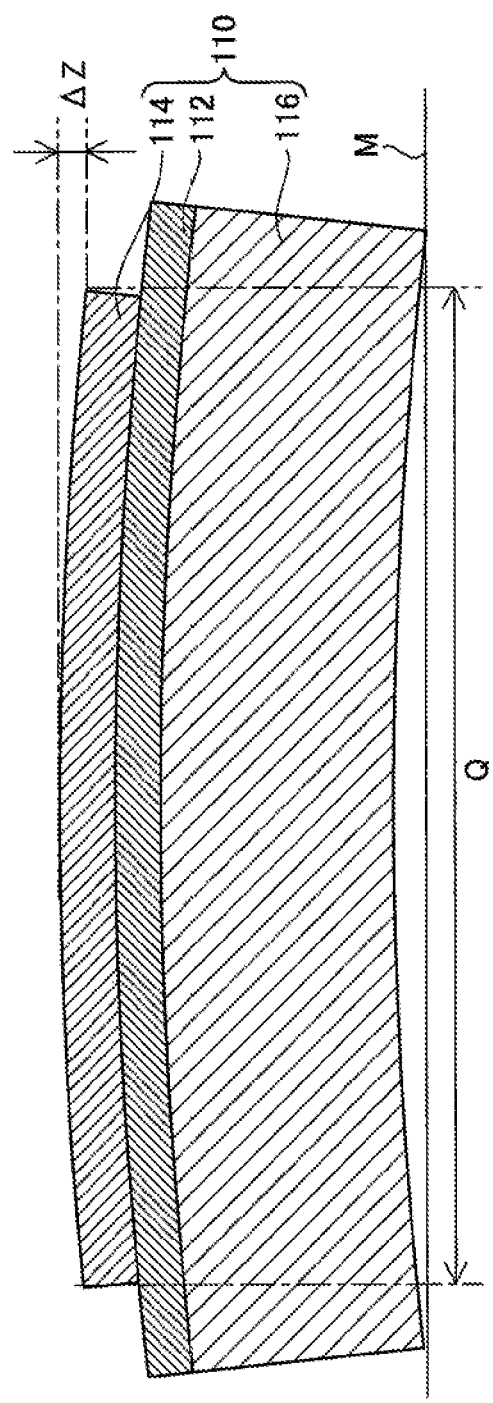
FIG. 7 Explanatory view showing the structure of the single cell 110 in a cross section taken along line VII-VII of FIG. 6.

FIG. 6 is an explanatory view schematically showing the structure of the single cell 110 in an XY plane (upper surface), and FIG. 7 is an explanatory view showing the structure of the single cell 110 in a cross section in parallel with the vertical direction (Z-axis direction) taken along line VII-VII of FIG. 6. The single cell 110 corresponds to the composite appearing in CLAIMS.

The single cell 110 satisfies at least the following first requirement for the outer surface of the cathode 114 located opposite the electrolyte layer 112 in the vertical direction (Z-axis direction) (hereinafter, called the "upper surface 114U of the cathode 114"). The upper surface 114U of the cathode 114 extends in planar directions approximately perpendicular to the vertical direction. The planar directions correspond to the second direction appearing in CLAIMS.

<First Requirement>

"As viewed in the vertical direction, the upper surface 114U of the cathode 114 has a curvature less than 0.0013 (1/mm), the curvature being determined on the basis of any three points juxtaposed at intervals of 5 mm."

Herein, the "curvature" is the reciprocal of the radius of an imaginary circle passing through the any three points, as viewed in a planar direction (a direction orthogonal to the vertical direction and to the direction in which the any three points are juxtaposed). The upper surface 114U of the cathode 114 corresponds to either one of two surfaces of the composite appearing in CLAIMS.

Whether or not the first requirement is satisfied is judged as follows.

(1) A partial region, not the entire region, of the upper surface 114U of the cathode 114 is taken as an object region E. The object region E is a square region located a predetermined width ΔH inward of the outline of the cathode 114. The predetermined width ΔH is 2.5% of a maximum width Q of the outline of the object region E as viewed in the vertical direction. In the example of FIG. 6, the maximum width Q is a diagonal width of the square cathode 114. A region extending from the outline of the cathode 114 and having the predetermined width ΔH is low in contribution to electricity generating reaction; thus, even if a crack or the like develops in the region, an adverse effect of the development of a crack or the like on the electricity generation characteristics of the single cell 110 is relatively small. Therefore, preferably, the region is excluded from the object region E as in the case of the present embodiment.

(2) A plurality of first imaginary straight lines L1 and a plurality of second imaginary straight lines L2 are disposed on the object region E. The plurality of first imaginary straight lines L1 are juxtaposed, at intervals of 5 mm, in one direction (X-axis direction in parallel with one pair of parallel sides of the cathode 114). The plurality of second imaginary straight lines L2 are juxtaposed, at intervals of 5 mm, in another direction (X-axis direction in parallel with the other pair of parallel sides of the cathode 114) perpendicular to the one direction. A plurality of intersections of the first imaginary straight lines L1 and the second imaginary straight lines L2 except those on the outermost imaginary straight lines L1 and L2 along the outline of the object region E are used as measuring points P for measuring curvature. One of the intersections of the first imaginary straight lines L1 and the second imaginary straight lines L2 approximately coincides with the center point O of the cathode 114 as viewed in the vertical direction. Notably, in FIG. 6, for convenience sake, the interval (5 mm) between the imaginary straight lines L1 and L2 is illustrated on a larger scale than an actual one in relation to the size of the cathode 114.

(3) Curvature is determined at each measuring point P. Specifically, the curvature is determined on the basis of three intersections (i.e., the measuring point P serving as the center intersection, and two intersections adjacently located on opposite sides of the measuring point P) juxtaposed on a straight line which is parallel to the first imaginary straight line L1 or the second imaginary straight line L2 as viewed in the vertical direction. For example, the curvature at a measuring point P2 (the center intersection) is determined on the basis of the measuring point P2 serving as the center intersection and two adjacent intersections (measuring points P1 and P3) juxtaposed on the first imaginary straight line L1. Specifically, as shown in the X1 region enlarged in FIG. 6, as viewed in a direction (Y-axis direction) orthogonal to the vertical direction (Z-axis direction) and to the direction in which the three measuring points P1 to P3 are juxtaposed (X-axis direction), the reciprocal of the radius of an imaginary circle passing through the three measuring points P1 to P3 is used as the curvature at the measuring point P2. Notably, information about the difference of elevation in the vertical direction among the three intersections can be obtained by a known apparatus and method, for example, an optical 3D measuring instrument.

(4) When all the curvatures determined at the measuring points P are less than 0.0013 (1/mm), the first requirement is judged to be satisfied.

Preferably, the single cell 110 further satisfies the following second requirement for the upper surface 114U of the cathode 114.

<Second Requirement>

"The upper surface 114U of the cathode 114 has a warp rate of 0.18% or less."

Herein, the "warp rate (%)" is expressed by the following formula.

Warp rate (%)=("Maximum difference of elevation ΔZ in object region $E$"/"Maximum width $Q$ of outline of object region $E$")×100

As exemplified in FIG. 7, the maximum difference of elevation ΔZ in the object region E is the maximum difference of elevation of the object region E in the cathode 114 when the single cell 110 is disposed on a horizontal plane M with the anode 116 facing downward. Notably, information about the difference of elevation in the vertical direction of the upper surface 114U of the cathode 114 can be obtained by a known apparatus and method, for example, an optical 3D measuring instrument.

A-4. Method of Manufacturing Fuel Cell Stack 100

First, the single cell 110 is manufactured. Specifically, the single cell 110 is manufactured through the following steps.

(Manufacture of Anode-Substrate-Layer Green Sheet)

To a mixed powder (100 parts by weight) of NiO powder (50 parts by weight) and YSZ powder (50 parts by weight), there are added organic beads (15% by weight of the mixed powder) as a pore forming material, butyral resin, DOP as plasticizer, dispersant, and a mixed solvent of toluene and ethanol. The resultant mixture is mixed in a ball mill, thereby preparing slurry. The organic beads are spherical particles formed of, for example, polymers such as polymethyl methacrylate and polystyrene. The obtained slurry is formed into a thin sheet by the doctor blade method, followed by drying to form an anode-substrate-layer green sheet having a thickness of 200 μm to 300 μm. Specifically, the obtained slurry is defoamed and stirred and is then coated on a carrier (not shown) in the form of a thin sheet formed by the doctor blade method. The coated slurry is carried by the carrier from an entrance of a drying chamber (not shown) to an exit of the drying chamber. Drying air is supplied into the drying chamber and flows from the entrance toward the exit.

By controlling the flow velocity of air at the entrance of the drying chamber, inhomogeneity of the dried anode-substrate-layer green sheet (for example, unevenness of thickness of the green sheet and unevenness of component density of the green sheet) is suppressed. As a result, an anode substrate layer formed by a firing step, which will be described later, can be prevented from suffering not only overall warpage of the anode substrate layer, but also occurrence of a local surface undulation in the anode substrate layer. Specifically, it is difficult to supply air into the drying chamber from the entrance in ouch a manner that the flow velocity (flow rate) becomes uniform in the width direction orthogonal to the carrying direction; i.e., within the conveyance chamber, a difference in the flow velocity of air is produced between different positions in the width direction. For example, because of resistance of an inner wall of the drying chamber, the flow velocity of air is slow at an outer position in the width direction as compared with the flow velocity of air at a central position in the width direction. If such a difference in the air flow velocity is present between positions in the width direction, the degree of unevenness of drying increases, particularly, in a region of slurry on the carrier that is located near the entrance and contains a still large amount of solvent; as a result, the dried anode-substrate-layer green sheet becomes inhomogeneous. Meanwhile, by reducing the flow velocity of air at the entrance, the difference in the air flow velocity between positions in the width direction can be reduced. Therefore, by adjusting the flow velocity of air at the entrance as appropriate, inhomogeneity of the anode-substrate-layer green sheet can be suppressed. Notably, the ratio between NiO powder and YSZ powder used to form the anode-substrate-layer green sheet can be changed as appropriate so long as required performance is exhibited. For example, NiO powder:YSZ powder may be 60:40 or 40:60. That is, the amount of NiO powder can be changed as appropriate within the range of from 40 parts by weight to 60 parts by weight with a balance of YSZ powder ouch that the amount of mixed powder of NiO powder and YSZ powder becomes 100 parts by weight.

(Manufacture of Anode-Activation-Layer Green Sheet)

To a mixed powder (100 parts by weight) of NiO powder (60 parts by weight) and YSZ powder (40 parts by weight), there are added butyral resin, DOP as plasticizer, dispersant, and a mixed solvent of toluene and ethanol. The resultant mixture is mixed in a ball mill, thereby preparing slurry. The obtained slurry is formed into a thin sheet by the doctor blade method, thereby yielding an anode-activation-layer green sheet having a thickness of 10 μm to 30 μm. Notably, the ratio between NiO powder and YSZ powder used to form the anode-activation-layer green sheet can be changed as appropriate so long as required performance is exhibited. For example, NiO powder:YSZ powder may be 50:50 or 40:60. That is, the amount of NiO powder can be changed as appropriate within the range of from 40 parts by weight to 60 parts by weight with a balance of YSZ powder such that the amount of mixed powder of NiO powder and YSZ powder becomes 100 parts by weight.

(Manufacture of Electrolyte-Layer Green Sheet)

To YSZ powder (100 parts by weight), there are added butyral resin, DOP as plasticizer, dispersant, and a mixed solvent of toluene and ethanol. The resultant mixture is mixed in a ball mill, thereby preparing slurry. The obtained slurry is formed into a thin sheet by the doctor blade method, thereby yielding an electrolyte-layer green sheet having a thickness of 5 μm to 15 μm.

(Lamination of Electrolyte Layer 112 and Anode 116)

The anode-substrate-layer green sheet, the anode-activation-layer green sheet, and the electrolyte-layer green sheet are bonded together, followed by debindering at about 280° C. Further, firing is performed at about 1,350° C., thereby yielding a laminate of the electrolyte layer 112 and the anode 116. As mentioned above, the single cell 110 of the present embodiment is an anode-support-type single cell. Therefore, the thickness of the anode activation layer (anode-activation-layer green sheet) and the thickness of the electrolyte layer 112 (electrolyte-layer green sheet) are very thin as compared with that of the anode substrate layer (anode-substrate-layer green sheet). Thus, the cause of warpage and local surface undulation of the laminate of the electrolyte layer 112 and the anode 116 (so-called half cell) is primarily inhomogeneity of the anode-substrate-layer green sheet. Specifically, in the laminate of the electrolyte layer 112 and the anode 116, since the electrolyte layer 112 and the anode activation layer are thin and deform easily as compared with the anode substrate layer, the laminate assumes a shape reflecting the warpage or local surface undulation of the anode substrate layer. As a result, the surface (upper surface) of the electrolyte layer 112 opposite the anode activation layer assumes a shape reflecting the warpage or local surface undulation of the anode substrate layer. Therefore, in the present embodiment, in the steps of manufacturing the electrolyte-layer green sheet and the anode-activation-layer green sheet, the flow velocity of drying air is not particularly controlled. Needless to say, even in the steps of manufacturing the electrolyte-layer green sheet and the anode-activation-layer green sheet, preferably, inhomogeneity of the electrolyte-layer green sheet and the anode-activation-layer green sheet is suppressed by controlling the flow velocity of drying air.

(Formation of Cathode 114)

A liquid mixture of $La_{0.6}Sr_{0.4}Co_{0.2}Fe_{0.8}O_3$ powder and isopropyl alcohol is prepared. The prepared liquid mixture is applied by screen printing onto the surface of the electrolyte layer 112 of the above-mentioned laminate, followed by firing at 1,100° C. for forming the cathode 114, thereby yielding a fired body (single cell 110 before undergoing reduction). Notably, similar to the thickness of the anode activation layer, etc., the thickness of the cathode 114 is also very thin as compared with that of the anode substrate layer (anode-substrate-layer green sheet). Thus, the influence of inhomogeneity of the cathode 114 on warp, etc., of the single cell 110 is small.

Subsequently, the remaining assembling steps (e.g., joining the cathode 114 and the cathode-side current collector 134 and clamping the fuel cell stack 100 with the bolts 22) are performed, thereby completing assembly of the fuel cell stack 100.

A-5. Effects of the Present Embodiment

As described above, in the fuel cell stack 100 of the present embodiment, as viewed in the vertical direction (first requirement), the upper surface 114U of the cathode 114 in the single cell 110 has a curvature less than 0.0013 (l/mm), the curvature being determined on the basis of any three points juxtaposed at intervals of 5 mm. By virtue of this, the single cell 110 can prevent a reduction in strength, which would otherwise result from local warpage of the surface of the single cell 110, in contrast to a structure in which a region having a curvature of 0.0013 (l/mm) or more is present on the upper surface 114U of the cathode 114. Also, according to the present embodiment, it is possible to prevent a reduction in electrical conductivity between the cathode 114 and the current collector elements 135 (cathode-side current collector 134), which would otherwise result from poor contact between the cathode 114 and the current collector elements 135 caused by local surface undulation of the upper surface 114U of the cathode 114.

In the fuel cell stack 100 of the present embodiment, the entire upper surface 114U of the cathode 114 of the single cell 110 has a warp rate of 0.18% or less (second requirement). By virtue of this, the strength of the single cell 110 can be enhanced as compared with a structure in which a warp rate of the entire surface is higher than 0.18%.

A-6. Performance Evaluation

A plurality of samples of single cell were manufactured, and performance evaluation was conducted on the manufactured single cell samples. FIG. 8 is an explanatory table showing the results of performance evaluation. The values of the percentage of curvature C in FIG. 8 show the degree of local surface undulation of the outer surface (upper surface 114U) of the cathode 114 of a single cell. Specifically, by the above-mentioned method of judging whether or not the first requirement is satisfied, the curvature C is measured at the measuring points P in the object region E. Next, on the basis of the results of measurement, the measurement points P are classified into a group of the measuring points P at which the curvature C is less than 0.0010 μm, a group of the measuring points P at which the curvature C is equal to or greater than 0.0010 μm and less than 0.0013 μm, a group of the measuring points P at which the curvature C is equal to or greater than 0.0013 μm and less than 0.0016 μm, and a group of the measuring points P at which the curvature C is equal to or greater than 0.0016 μm. The percentage of curvature in each group means the percentage of the number of the measuring points P in the group to the total number of the measuring points P in the object region E. The warp rate in FIG. 8 means the overall warp rate of the upper surface 114U of the cathode 114 in the above-mentioned second requirement. The presence of cell cracking means the presence of a fissure or crack (hereinafter, called "a crack or the like") in the single cell samples incorporated in the fuel cell stack 100. Particularly, pressing of the cathode-side current collector 134 against the cathode 114 causes the development of a crack or the like in the single cell. Whether or not a crack or the like is present in the single cell can be judged, for example, by visual inspection or from sound produced from the single cell when it is hit.

A-6-1. Samples:

As shown in FIG. 8, performance evaluation was conducted on Comparative Example and Examples 1 to 6. Comparative Example and Examples 1 to 6 are single cells each having the electrolyte layer 112, the cathode 114, and the anode 116 and differ from one another in at least either one of the degree of local surface undulation and the overall warp rate. Comparative Example has the measuring points P at which the curvature C is equal to or greater than 0.0013 μm, whereas Examples 1 to 6 do not have the measuring points P at which the curvature C is equal to or greater than 0.0013 μm. Comparative Example and Examples 1 and 3 have a warp rate equal to or greater than 0.18%, and Examples 2 and 4 to 6 have a warp rate less than 0.18%.

A-6-2. Evaluation Results:

As shown in FIG. 8, Comparative Example has the measuring points P at which the curvature C is equal to or greater than 0.0013 μm and suffered a crack or the like in the single cell. By contrast, Examples 1 to 6 do not have the measuring points P at which the curvature C is equal to or greater than 0.0013 μm and are free of the development of a crack or the like in the single cell. The evaluation results reveal that, through the single cell's satisfaction of the first requirement (as viewed in the vertical direction, the curvature of the upper surface 114U of the cathode 114, which is determined on the basis of any three points juxtaposed at intervals of 5 mm, is less than 0.0013 (l/mm)), the development of a crack or the like in the single cell can be prevented. Also, in spite of Comparative Example having a warp rate approximately similar to those of Examples 1 and 3, only Comparative Example suffers the development of a crack or the like in the single cell. This means that, among the single cells having the same overall warp rate, the single cell having a local surface undulation is apt to suffer the development of a crack or the like. In other words, even though the warp rate is equal to or greater than 0.18%, the single cell can prevent the development of a crack or the like therein through satisfaction of the first requirement. That is, satisfaction of the first requirement is effective for the single cell in preventing the development of a crack or the like therein.

B. Modifications

The technique disclosed in the present specification is not limited to the above embodiment, but may be modified into various other forms without departing from the gist thereof. For example, the technique may be modified as described below.

In the above embodiment, the composite is the anode-support-type single cell 110; however, the composite may be an electrolyte-support-type single cell or a cathode-supporttype single cell. For example, in the electrolyte-support-type single cell, preferably, the outer surface opposite the electrolyte layer of either one of the anode and the cathode satisfies at least the first requirement. The composite is not limited to the single cell, but may be a half cell that has the anode and the electrolyte layer without having the cathode. In the case of the half cell, preferably, either one of the outer surface of the anode opposite the electrolyte layer and the outer surface of the electrolyte layer opposite the anode (i.e., the outer surface of the half cell opposite the anode) satisfies at least the first requirement. The half cell may have a structure in which an intermediate layer (reaction prevention layer) is disposed on the electrolyte layer on the side opposite the anode. In the case of the half cell having the intermediate layer, preferably, either one of the outer surface of the anode opposite the electrolyte layer and the outer surface of the intermediate layer opposite the electrolyte layer (i.e., the outer surface of the half cell opposite the anode) satisfies at least the first requirement. Notably, either one of two surfaces of the composite appearing in claims means at least either one of two outer surfaces located most outward with respect to the first direction.

The single cell 110 may have a structure in which the intermediate layer (reaction prevention layer) is provided at least between the electrolyte layer 112 and the cathode 114 or between the electrolyte layer 112 and the anode 116.

In the above embodiment, materials used to form the members are provided merely by way of example. Other materials may be used to form the members.

For example, the technique disclosed in the present specification can be applied to publicly known structures of fuel cells of the cylindrical type, the cylindrical-flat-type, etc. In the case of these fuel cells, the above-mentioned maximum width Q in the first requirement is the maximum outside diameter of a circular cell.

The above embodiment refers to SOFC for generating electricity by utilizing the electrochemical reaction between hydrogen contained in fuel gas and oxygen contained in oxidizer gas; however, the present invention is also applicable to an electrolysis cell unit which is the smallest unit of a solid oxide electrolysis cell (SOEC) for generating hydrogen by utilizing the electrolysis of water, and to an electrolysis cell stack having a plurality of electrolysis cell units. Since the structure of the electrolysis cell stack is publicly known as described in, for example, Japanese Patent Application Laid-Open (kokai) No. 2014-207120, detailed description thereof is omitted, but schematically, the electrolysis cell stack has a structure similar to that of the fuel cell stack 100 in the above embodiment. That is, the fuel cell stack 100 in the above embodiment may be read as "electrolysis cell stack," and the electricity generation unit 102 may be read as "electrolysis cell unit." However, in operation of the electrolysis cell stack, voltage is applied between the cathode 114 and the anode 116 such that the cathode 114 is a positive electrode (anode), whereas the anode 116 is a negative electrode (cathode), and water vapor is supplied as material gas through the communication hole 108. As a result, the electrolysis of water occurs in the electrolysis cell units, whereby hydrogen gas is generated in the fuel chambers 176, and hydrogen is discharged to the outside of the electrolysis cell stack through the communication hole 108. Even in such an electrolysis cell unit and such an electrolysis cell stack having the above-described structures, similar to the above embodiment, if the electrolysis cell employs a structure that satisfies the first requirement, the electrolysis cell will yield the effect of preventing a reduction in strength, which would otherwise result from local warpage of the surface of the composite.

DESCRIPTION OF REFERENCE NUMERALS

22: bolt; 24: nut; 26: insulation sheet; 27: gas passage member; 28: body portion; 29: branch portion; 100: fuel cell stack; 102: electricity generation unit; 104, 106: end plate; 108: communication hole; 110: single cell; 112: electrolyte layer; 114: cathode; 114U: upper surface; 116: anode; 120: separator; 121: hole; 124: bonding portion; 130: cathode-side frame; 131: hole; 132: oxidizer gas supply communication hole; 133: oxidizer gas discharge communication hole; 134: cathode-side current collector; 135: current collector element; 140: anode-side frame; 141: hole; 142: fuel gas supply communication hole; 143: fuel gas discharge communication hole; 144: anode-side current collector; 145: electrode facing portion; 146: interconnector facing portion; 147: connection portion; 149: spacer; 150: interconnector; 161: oxidizer gas introduction manifold; 162: oxidizer gas discharge manifold; 166: air chamber; 171: fuel gas introduction manifold; 172: fuel gas discharge manifold; 176: fuel chamber; E: object region; FG: fuel gas; FOG: fuel offgas; ΔH: predetermined width; L1: first imaginary straight line; L2: second imaginary straight line; M: plane; O: center point; OG: oxidizer gas; OOG: oxidizer offgas; P (P1 to P3): measuring point; P2: measuring point; Q: maximum width; and ΔZ: maximum difference of elevation.

The invention claimed is:

1. A composite comprising:
an electrolyte layer containing solid oxide; and
at least one electrode selected from a cathode disposed on one side of the electrolyte layer in a first direction and an anode disposed on the other side of the electrolyte layer in the first direction,
wherein the composite is made by laminating green sheets and then firing the laminated green sheets,
the composite being characterized in that one surface of two surfaces of the composite located on opposite sides in the first direction satisfies a first requirement that, a curvature determined on the basis of any three points juxtaposed as viewed in the first direction at intervals of 5 mm is less than 0.0013 (1/mm) and that, as viewed in a second direction perpendicular to the first direction, the curvature is the reciprocal of the radius of an imaginary circle passing through the any three points.

2. A composite according to claim 1, wherein the surface of the composite satisfying the first requirement further satisfies a second requirement that the surface has a warp rate of 0.18% or less.

3. A composite according to claim 1, wherein
the composite includes the cathode and the anode;
the cathode is disposed on one side of the composite in the first direction;
the anode is disposed on the other side of the composite in the first direction; and
the surface of the composite on the one side in the first direction satisfies the first requirement.

4. A composite according to claim 1, wherein
the composite includes only the electrolyte layer and the anode selected from the electrolyte layer, the cathode, and the anode; and
the surface of the composite on the one side in the first direction satisfies the first requirement.

5. An electrochemical reaction cell stack comprising a plurality of electrochemical reaction units each comprising a single electrochemical reaction cell including an electrolyte layer containing solid oxide, and a cathode and an anode facing each other in a first direction with the electrolyte layer intervening therebetween, and a current collector disposed on a cathode side of the single electrochemical reaction cell and electrically connected to the cathode, wherein at least one of the plurality of electrochemical reaction units includes the composite according to claim 1.

* * * * *